US012645112B2

(12) United States Patent
Li et al.

(10) Patent No.: US 12,645,112 B2
(45) Date of Patent: Jun. 2, 2026

(54) ARRAY SUBSTRATE AND LIQUID CRYSTAL DISPLAY PANEL

(71) Applicants: Chengdu BOE Optoelectronics Technology Co., Ltd., Chengdu (CN); BOE TECHNOLOGY GROUP CO., LTD., Beijing (CN)

(72) Inventors: Haohao Li, Beijing (CN); Yin Deng, Beijing (CN); Bo Wu, Beijing (CN); Ze Zhao, Beijing (CN); Zheng Liao, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 84 days.

(21) Appl. No.: 18/698,816

(22) PCT Filed: Mar. 3, 2023

(86) PCT No.: PCT/CN2023/079609
§ 371 (c)(1),
(2) Date: Apr. 5, 2024

(87) PCT Pub. No.: WO2024/182931
PCT Pub. Date: Sep. 12, 2024

(65) Prior Publication Data
US 2025/0237901 A1     Jul. 24, 2025

(51) Int. Cl.
*G02F 1/1333* (2006.01)
*G02F 1/1362* (2006.01)
*G09G 3/36* (2006.01)

(52) U.S. Cl.
CPC .. *G02F 1/133382* (2013.01); *G02F 1/136286* (2013.01); *G09G 3/36* (2013.01)

(58) Field of Classification Search
CPC ........ G02F 1/133382; G02F 1/136286; G09G 3/36
See application file for complete search history.

(56) References Cited

U.S. PATENT DOCUMENTS 9,826,574 B2 * 11/2017 Lindley .................... H05B 3/26
2010/0182559 A1 * 7/2010 Chang ................. G02F 1/13452
                                                            349/161
2017/0125506 A1 * 5/2017 Kim ................... H10D 30/6723

FOREIGN PATENT DOCUMENTS

CN        107291296 A    10/2017
CN        107329307 A    11/2017
                    (Continued)

*Primary Examiner* — Lucy P Chien
(74) *Attorney, Agent, or Firm* — HOUTTEMAN LAW LLC

(57) ABSTRACT

The present disclosure provides an array substrate and a liquid crystal display panel, the array substrate includes a display area and a peripheral area surrounding the display area, the display area is divided into a plurality of heating zones, and each heating zone is provided with a heating electrode; the array substrate further includes a zone temperature control module and a heating wire module, the heating wire module includes a plurality of heating wire groups, the heating wire groups are arranged corresponding to the heating zones one to one, and a first terminal of each heating wire group is electrically connected with the zone temperature control module; the zone temperature control module is located in the peripheral area, and is configured to control each heating wire group to input a heating signal into the heating zone corresponding thereto.

20 Claims, 10 Drawing Sheets

(56)  References Cited

FOREIGN PATENT DOCUMENTS

| | | | | | |
|---|---|---|---|---|---|
| CN | 110221468 | A | 9/2019 | | |
| CN | 109031813 | B | * 4/2021 | ....... | G02F 1/133382 |
| CN | 112859416 | A | 5/2021 | | |
| CN | 113031326 | A | 6/2021 | | |
| CN | 113109963 | A | 7/2021 | | |
| CN | 113109964 | A | 7/2021 | | |
| CN | 114265250 | A | 4/2022 | | |
| JP | H08211368 | A | 8/1996 | | |
| JP | 2023000172 | A | 1/2023 | | |

* cited by examiner

1

ARRAY SUBSTRATE AND LIQUID CRYSTAL DISPLAY PANEL

CROSS-REFERENCE TO RELATED APPLICATIONS

The present disclosure is a National Phase Application filed under 35 U.S.C. 371 as a national stage of PCT/CN2023/079609 filed on Mar. 3, 2023 the content of which is incorporated herein in their entirety by reference.

TECHNICAL FIELD

The present disclosure relates to the field of display technology, and in particular to an array substrate and a liquid crystal display panel.

BACKGROUND

Liquid crystal display panels are widely used because of their excellent characteristics of high brightness, high contrast, low cost, and the like. In order to meet the requirements of special environments, the liquid crystal display panels are desired to operate normally in a low-temperature environment. Under normal conditions, the viscosity coefficient of the liquid crystal is obviously influenced by temperature, and in a low-temperature environment, the viscosity coefficient of the liquid crystal is relatively great, so that the response time is too long, resulting in a trailing phenomenon in a display picture. In order to solve this problem, heating wires are generally uniformly arranged in a display area of the liquid crystal display panel, and the display area is heated by the heating powers generated by the heating wires. However, due to the different heat transfer and heat dissipation at different positions of the LCD display panel, the temperature distribution in the entire display area is uneven, and generally, the temperature in a central region of the display area is relatively high, while the temperature in a peripheral region of the display area is relatively low. The non-uniform temperature distribution may lead to differences in response time of the liquid crystals in different regions, thereby affecting the display effect.

In order to solve the above problem, in the related art, the difference in heat dissipation in different regions of the display area is compensated by loading different heating signals (i.e., different voltages) to different heating wires to generate different heating powers. However, such compensation method can only control different heating wires separately, and the heating powers at different positions of a single heating wire are the same, which results in that different regions of the display area in an extending direction in which the heating wire extends cannot be controlled separately, and thus heat compensation cannot be performed in the extending direction in which the heating wire extends, which has a certain limitation on uniformity control of the temperature. In addition, for the low temperature environment, although the temperature in the peripheral region of the display area can be prevented from being too low by increasing the heating power of all the heating wires, the temperature in the central region of the display area is easily too high, and the increase in the temperature of all the heating wires may further lead to an increase in the overall power consumption.

SUMMARY

The present disclosure is directed to solve at least one technical problem in the related art, and provides an array substrate and a liquid crystal display panel, which can solve the problem that the temperature distribution of a display area is still uneven because heat compensation cannot be performed in the extending direction in which the heating wires extend in the related art, and because not all the heating wires are needed to increase the heating power thereof, the problem that in a low temperature environment, the temperature of a central region is too high and an overall power consumption is increased can be avoided.

In order to achieve the above object, an embodiment of the present disclosure provides an array substrate, including a display area and a peripheral area surrounding the display area, where the display area is divided into a plurality of heating zones, and each heating zone is provided with a heating electrode;

the array substrate further includes a zone temperature control module and a heating wire module, the heating wire module includes a plurality of heating wire groups, the heating wire groups are arranged corresponding to the heating zones one to one, and a first terminal of each heating wire group is electrically connected with the zone temperature control module; and the zone temperature control module is located in the peripheral area, and is configured to control each heating wire group to input a heating signal into the heating zone corresponding thereto.

In some implementations, a plurality of the heating wire groups are spaced apart from each other and in parallel in a first direction, and average lengths of the heating wire groups are different from each another.

In some implementations, each of the heating wire groups includes a first heating wire and a second heating wire, one of the first heating wire or the second heating wire being electrically connected to a signal input terminal of the zone temperature control module, and the other of the first heating wire or the second heating wire being electrically connected to a signal output terminal of the zone temperature control module.

In some implementations, the first heating wire and the second heating wire are electrically connected to two opposite edge positions of the heating electrode in a corresponding heating zone.

In some implementations, the display area includes M×N heating zones arranged in an array, each of the heating zones includes m×n sub-pixels arranged in an array, where M, N, m and n are positive integers;

the first terminal of each heating wire group extends out from a first side edge of the display area and is electrically connected with the zone temperature control module; the first side edge is a side edge of the display area closest to the zone temperature control module; and a second terminal of each heating wire group extends from the first side edge to a corresponding heating zone in the first direction, and the heating wire groups corresponding to the heating zones arranged in each row in the first direction are staggered with each other in a second direction, the second direction being perpendicular to the first direction.

In some implementations, a heating wire in each heating wire group is located in a first pixel interval between any two adjacent rows of sub-pixels arranged in the second direction; and for each row of the heating zones arranged in the second direction, the first pixel interval where the heating wire group corresponding to one of any two adjacent heating zones is located is adjacent to the first pixel interval where the heating wire group corresponding to the other of the any two adjacent heating zones is located.

In some implementations, one of the heating wire groups corresponding to the heating zone adjacent to the first side edge in each row of the heating zones arranged in the first direction includes a third heating wire and a fourth heating wire, and the third heating wire and the fourth heating wire are respectively located in two first pixel intervals adjacent to edges of the heating zone and respectively electrically connected to two opposite edge positions of the heating electrode corresponding to the heating zone through via holes.

In some implementations, each of the heating wire groups corresponding to the heating zones not adjacent to the first side edge in each row of the heating zones arranged in the first direction includes a fifth heating wire and a sixth heating wire, and the fifth heating wire and the sixth heating wire extend into two first pixel intervals adjacent to edges of the heating zone through a connecting wire structure, respectively, and are electrically connected to two opposite edge positions of the heating electrode corresponding to the heating zone through via holes, respectively.

In some implementations, the connecting wire structure includes a main connecting line and an auxiliary connecting line, the main connecting line being parallel to the first direction; the auxiliary connecting line intersecting one of the fifth heating wire or the sixth heating wire;

the first pixel intervals where the fifth heating wire and the sixth heating wire are located are both first intervals, the first pixel intervals adjacent to the edges of the heating zone are both second intervals, and the first pixel interval between the first interval and the second interval is a third interval; each third interval and each second interval are respectively provided with one main connecting line; and the auxiliary connecting line is located in a second pixel interval, the second pixel interval is an interval between any two adjacent columns of sub-pixels arranged in the second direction, at least one auxiliary connecting line is connected between every two adjacent main connecting lines, and at least one auxiliary connecting line is connected between each of the fifth heating wire and the sixth heating wire and the main connecting line adjacent thereto.

In some implementations, at least one second pixel interval in each heating zone is provided with the via hole, and the second pixel interval is an interval between any two adjacent columns of sub-pixels arranged in the second direction.

In some implementations, the array substrate includes a base substrate, and a thin film transistor and a passivation layer which are arranged on the base substrate and sequentially arranged along a direction away from the base substrate, and each of the sub-pixels is provided with one thin film transistor correspondingly;

each heating electrode is arranged on a side, away from the base substrate, of the passivation layer;

the array substrate further includes an insulating layer, the heating wire groups are arranged on the base substrate, and the insulating layer is arranged between a layer where the heating wire groups are located and a gate layer of the thin film transistor; and the array substrate further includes a data line, the via hole is located on a side, away from the thin film transistor, of the data line, is arranged between the heating electrode and the corresponding heating wire group, and sequentially penetrates through the passivation layer, a gate insulating layer of the thin film transistor and the insulating layer along a direction close to the base substrate.

In some implementations, an orthographic projection of the heating wire in each heating wire group on the base substrate overlaps with an orthographic projection of the data line adjacent to the first pixel interval where the heating wire is located on the base substrate, and a width of the heating wire in each heating wire group is less than or equal to a width of the data wire.

In some implementations, a contour of an orthographic projection of the heating electrode on a plane where the display area is located coincides with a contour of the heating zone.

In some implementations, the array substrate further includes a common electrode, the common electrode includes a plurality of transparent metal oxide electrode blocks, and the transparent metal oxide electrode blocks are multiplexed as the heating electrodes.

In some implementations, the heating wire groups are arranged in a same layer as the common electrode.

In some implementations, the array substrate further includes a display driving module configured to periodically input a driving signal to the plurality of transparent metal oxide electrode blocks, where each cycle of the driving signal includes a signal-on period and a signal-off period; and the zone temperature control module inputs the heating signal to the transparent metal oxide electrode blocks in the signal-off period and stops inputting the heating signal to the transparent metal oxide electrode blocks in the signal-on period.

In some implementations, the common electrode is further multiplexed as a touch electrode;

the array substrate further includes a touch driving module and a display driving module, and the first terminals of each heating wire group are electrically connected with the touch driving module and the display driving module, respectively; and the display driving module is configured to periodically input a driving signal to the plurality of transparent metal oxide electrode blocks, and each cycle of the driving signal includes a signal-on period and a signal-off period; the touch driving module is multiplexed as the zone temperature control module, and inputs a touch signal to each transparent metal oxide electrode block in the signal-off period, and simultaneously multiplexes the touch signal as the heating signal, independently controls an intensity and/or a time duration of the touch signal input to the transparent metal oxide electrode blocks in the corresponding heating zone, and stops inputting the touch signal to each transparent metal oxide electrode block in the signal-on period.

In some implementations, the common electrode is multiplexed as a touch electrode;

the array substrate further includes a touch driving module and a display driving module, and the first terminals of each heating wire group are electrically connected with the touch driving module and the display driving module, respectively; and the display driving module is configured to periodically input a driving signal to the plurality of transparent metal oxide electrode blocks, and each cycle of the driving signal includes a signal-on period and a signal-off period; the touch driving module is multiplexed as the zone temperature control module, independently inputs touch signals to the transparent metal oxide electrode blocks in a first sub-period of the signal-off period, independently inputs heating signals to the transparent metal oxide electrode blocks in a second sub-period of the signal-off period, and stops inputting the touch signals and the heating signals to the transparent metal oxide electrode blocks in the signal-on period.

In some implementations, the display driving module and the zone temperature control module are both located in the peripheral area, and the zone temperature control module is adjacent to the first side edge of the display area, and the display driving module is adjacent to a second side edge of the display area, the first side edge intersecting the second side edge; and the first terminal of each heating wire group extends out from the first side edge and is electrically connected with the zone temperature control module.

In some implementations, the display driving module and the touch driving module are integrated together and located at the peripheral area, and the display driving module and the touch driving module integrated together are adjacent to a second side edge of the display region; and the first terminal of each heating wire group extends out from the second side edge and is electrically connected with the display driving module and the touch driving module integrated together.

In some implementations, a material of the heating wire in the heating wire group is a conductive metal.

In some implementations, the conductive metal includes any one or more of aluminum, copper and molybdenum.

As another technical solution, the present disclosure further provides a liquid crystal display panel, including the above-mentioned array substrate provided in the present disclosure.

DETAIL DESCRIPTION OF EMBODIMENTS

Figure 1:
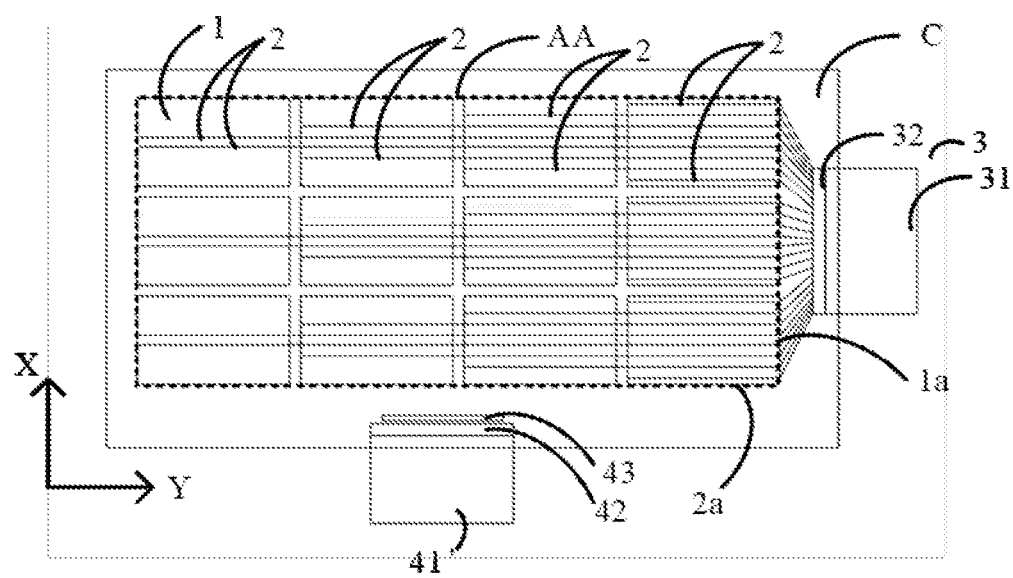
FIG. 1 is a schematic structural diagram of an array substrate according to an embodiment of the present disclosure.

To make the objects, technical solutions and advantages of the embodiments of the present disclosure more apparent, the technical solutions of the embodiments of the present disclosure will be clearly and completely described below with reference to the drawings. All other embodiments, which can be derived by those skilled in the art from the described embodiments of the present disclosure without creative effort, are within the protection scope of the present disclosure.

The shapes and sizes of the components in the drawings are not to scale, but are merely intended to facilitate an understanding of the contents of the embodiments of the present disclosure.

Unless defined otherwise, technical or scientific terms used herein shall have the ordinary meaning as understood by those skilled in the art to which the present disclosure belongs. The use of "first", "second" and the like in the present disclosure is not intended to indicate any order, quantity, or importance, but rather is used to distinguish one element from another. Also, the terms "a", "an" or "the" and similar referents do not denote a limitation of quantity, but rather denote the presence of at least one. The word "comprising/including" or "comprises/includes", or the like, means that the element or item preceding the word includes the element or item listed after the word and its equivalent, but does not exclude other elements or items. The terms "connecting/coupling" or "coupled/connected" and the like are not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

The embodiments of the present disclosure are not limited to the embodiments shown in the drawings, but include modifications of configurations formed based on a manufacturing process. Thus, the regions illustrated in the drawings have schematic properties, and the shapes of the regions shown in the drawings illustrate specific shapes of regions of elements, but are not intended to be limiting.

Referring to FIG. 1, an embodiment of the present disclosure provides an array substrate, which includes a display area AA and a peripheral area C surrounding the display area AA, the display area AA is divided into a plurality of heating zones 1 in various manners, for example, the plurality of heating zones 1 are arranged in an array. Alternatively, in order to improve the heating uniformity of the whole display area AA, a whole contour of the plurality of heating zones 1 substantially coincides with a contour of the display area AA (i.e., the dashed box in FIG. 1), and an interval between every two adjacent heating zones 1 is as small as possible, for example, the interval between every two adjacent heating zones 1 may be a pitch between two adjacent sub-pixels.

Each heating zone 1 is provided with a heating electrode therein, and in some implementations, a contour of an orthographic projection of the heating electrode on a plane where the display area AA is located coincides with a contour of the heating zone 1, that is, the heating electrode completely covers the heating zone 1, so that a plurality of heating electrodes can substantially cover the whole display area AA, and the heating uniformity can be improved. The heating zone 1 shown in FIG. 1 may also be represented as the heating electrode in a case where the heating electrode completely covers the heating zone 1. Certainly, in practical applications, a certain interval may be provided between the contour of the orthographic projection of the heating electrode on the plane where the display area AA is located and the contour of the heating zone 1 as desired, that is, the heating electrode partially covers the heating zone 1, as long as the requirement on the heating uniformity is met.

The array substrate further includes a zone temperature control module 3 and a heating wire module, where the heating wire module includes a plurality of heating wire groups, and in some implementations, each heating wire group includes two heating wires 2 including a first heating wire and a second heating wire. The heating wire groups are provided corresponding to the heating zones 1 one to one, and first terminals of the heating wire groups (i.e., right terminals of the heating wires 2 in FIG. 1) are electrically connected to the zone temperature control module 3.

The heating electrodes are configured for heating, the heating wire group are configured for auxiliary heating, and the heating wire groups are further configured for transmitting heating signals, for example, taking the heating wire group including a first heating wire and a second heating wire as an example, any one of the first heating wire or the second heating wire is electrically connected with a signal input terminal of the zone temperature control module 3, and the other one of the first heating wire or the second heating wire is electrically connected with a signal output terminal of the zone temperature control module 3. The heating wire 2 electrically connected with the signal input terminal of the zone temperature control module 3 is configured to input the heating signal output by the zone temperature control module 3 into the corresponding heating electrode in the heating zone 1, and the other heating wire 2 electrically connected with the signal output terminal of the zone temperature control module 3 is configured to output the heating signal in the heating electrode to the zone temperature control module 3, so that a loop of the heating signal can be formed.

Alternatively, taking a case where the heating wire group includes a first heating wire and a second heating wire as an example, the first heating wire and the second heating wire are electrically connected to two opposite edge positions of the heating electrode in the corresponding heating zone 1, respectively. In this way, the heating signal may substantially pass through the whole heating electrode, i.e., the heating signal flows from the edge position on one side of the heating electrode to the edge position on the other side of the heating electrode, so that a corresponding local region of the display area AA can be prevented from being unheated due to the fact that a current does not pass through a local region of the heating electrode, and the heating uniformity can be improved. In addition, with the heating wire groups configured to transmitting the heating signals, all the heating electrodes can be ensured to achieve the same heating effect under a condition that the heating signals with the same intensity are loaded to all the heating electrodes, so that in a case where the temperature difference between different heating zones 1 needs to be compensated, the accuracy of temperature compensation can be ensured.

The zone temperature control module 3 may control each heating wire group to input a heating signal to a corresponding heating zone, and specifically, the zone temperature control module 3 is configured to independently control the intensity and/or a time duration of the heating signal input to the heating electrode in each corresponding heating zone 1 through the heating wire groups, that is, to independently control the heating electrodes, so as to control the intensity and/or the time duration of the heating signal input to the heating electrode in the corresponding heating zone 1 according to the temperature difference between the heating zones 1, so as to compensate the temperature difference between the heating zones 1, thereby facilitating the temperature uniformity of the whole display area AA, and further improving the display uniformity. The zone temperature control module 3 includes, for example, a flexible circuit board (FPC) 31 for controlling heating and a chip on film 32, and the flexible circuit board 31 is electrically connected to the first terminal of each heating wire group through the chip on film 32.

Compared with the related art, with the heating electrodes configured for heating and the heating wires configured for auxiliary heating, the heating mode of present disclosure has the following advantages: on one hand, the plurality of heating electrodes may substantially cover the whole display area AA, facilitating to improve the heating uniformity of the display area; on the other hand, the layout of the heating electrodes may be matched with the division of the heating zones 1, namely, a zone control can be achieved more flexibly without being limited by the wiring of the heating wires, so that the problem in the prior art that different regions of the display area AA in the extending direction in which the heating wires extend cannot be controlled in a zone control mode, and thus the heat compensation cannot be achieved in the extending direction in which the heating wires extend can be avoided, and the control of the temperature uniformity of the whole display area AA can be achieved. Furthermore, for a low temperature environment, in the embodiment of the present disclosure, it is only needed to increase the intensity and/or the time duration of the heating signal input to the heating electrode in the heating zone 1 located in the peripheral region of the display area AA, so as to separately increase the temperature of the peripheral region of the display area AA, that is, selectively heating is performed without increasing the power of all the heating wires as in the related art, thereby not only avoiding the temperature of the peripheral region of the display area AA from being too low, but also avoiding the temperature of the central region of the display area AA from being too high, and further avoiding the increase of the overall power consumption.

In some alternative implementations, taking the contour of the display area AA being in a shape of a rectangle or a square as an example, the plurality of heating zones 1 are arranged in an array within the display area AA, that is, the plurality of heating zones 1 are arranged in a first direction (i.e., a Y direction in FIG. 1) and a second direction (i.e., an X direction in FIG. 1) perpendicular to each other. The plurality of heating wire groups are arranged in parallel in the first direction at intervals, and average lengths of the heating wire groups adjacent to each other are different. Taking a case where each heating wire group includes a first heating wire and a second heating wire as an example, the average length of the heating wire group refers to an average of lengths of the first heating wire and the second heating wire. In this way, in a case where the first terminals of the heating wire groups are all electrically connected with the zone temperature control module 3, with the different average lengths of the heating wire groups adjacent to each other, the positions of the second terminals of the heating wire groups adjacent to each other correspond to different heating zones 1, so that the heating wire groups adjacent to each other may be arranged corresponding to different heating zones 1, and the zone temperature control module 3 can independently control the heating electrodes in the corresponding heating zones 1 through the respective heating wire groups.

Figure 2:
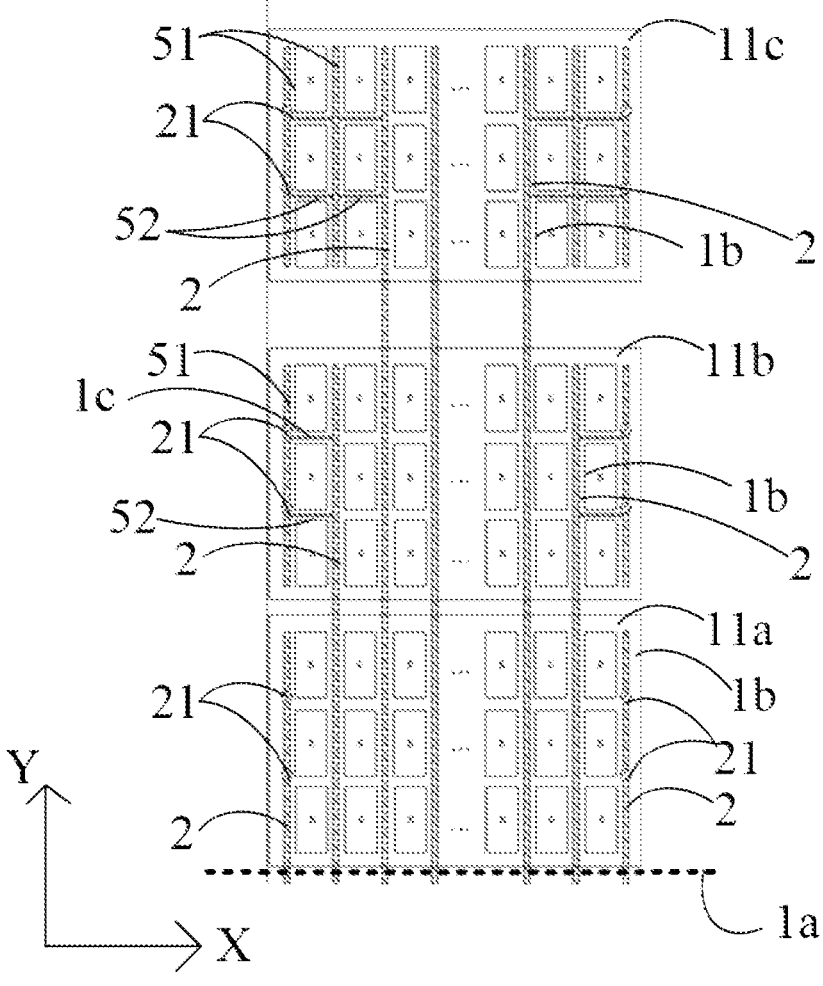
FIG. 2 is a schematic structural diagram illustrating three heating zones arranged in a first direction in each row according to an embodiment of the present disclosure.

In some alternative implementations, the display area AA includes M×N heating zones 1 arranged in an array, and each heating zone 1 includes m×n sub-pixels arranged in an array, where M, N, m and n are all positive integers. The first terminal of each heating wire group extends out from a first side 1*a* of the display area AA and is electrically connected to the zone temperature control module 3. The first side edge 1*a* is a side edge of the display area AA closest to the zone temperature control module 3, i.e., the side edge of the display area AA adjacent to the zone temperature control module 3. The second terminal (a left terminal of the heating wire group in FIG. 1) of each heating wire group extends from the first side edge 1*a* into the corresponding heating zone 1 in the first direction (i.e., the Y direction), and the heating wire groups corresponding to the heating zones 1 arranged in each row in the first direction (i.e., the Y direction) are staggered mutually in the second direction (i.e., the X direction). Specifically, the first terminals of all the heating wire groups extend from the same side edge (i.e., the first side edge 1*a*), the second terminals of all the heating wire groups extend in the same direction (i.e., in a direction perpendicular to and away from the first side edge 1*a*), all the heating wire groups are parallel to each other. In some implementations, the heating wires (e.g., including the first heating wire and the second heating wire) in the same heating wire group have the same length, while the heating wires (e.g., including the first heating wire and the second heating wire) in different heating wire groups may have different lengths so as to extend into the respective corresponding heating zones 1, and, as shown in FIGS. 1 and 2, in each row of heating zones 1 arranged in the first direction (i.e., the Y direction), the second terminals of the respective heating wire groups corresponding to all the heating zones 1 not adjacent to the first side edge 1*a* pass through the corresponding heating zones 1 in the row while extending in the first direction towards the left side in FIG. 1, and it is necessary to make the heating wire groups corresponding to the row of heating zones 1 staggered with each other in the second direction, so as to ensure that the heating wire groups do not overlap with other heating wire groups when passing through the corresponding heating zones 1. For example, as shown in FIG. 2, for each row of heating zones 1 arranged in the first direction (i.e., the Y direction), the heating zone 11*a* is adjacent to the first side edge 1*a*, and the remaining heating zones (FIG. 2 shows only two heating zones 11*b*, 11*c* of the heating zones) are not adjacent to the first side edge 1*a*, so that for the heating zone 11*b*, the second terminal of the heating wire group corresponding the heating zone 11*b* needs to pass through the heating zone 11*a*; for the heating zone 11*c*, the second terminal of the heating wire group corresponding the heating zone 11*c* needs to pass through the heating zone 11*a* and the heating zone 11*b* in this order. Therefore, the length of each heating wire group is related to the distance between the heating zone corresponding to the heating wire group and the first side edge 1*a*, and the more the distance is, the longer the length of the heating wire group is, and the less the distance is, the shorter the length of the heating wire group is.

In some alternative implementations, for each row of the heating zones 1 arranged in the first direction (i.e., the Y direction), the farther the heating zone 1 is from the first side edge 1*a*, the smaller the distance between the two heating wires 2 in the heating wire group corresponding to the heating zone 1 is. That is, the further the heating zone 1 is away from the first side edge 1*a*, the closer the two heating wires 2 in each heating wire group are to each other. With such arrangement, the heating wires 2 in the heating wire group corresponding to another heating zone do not pass through a region between the heating wire 2 and an edge of the heating zone 1 where the heating wire 2 is located, and the heating wire group corresponding to the another heating zone 1 only passes through a region between the two heating wires 2 in the heating wire group corresponding to the heating zone 1, so that the region between the heating wire 2 and the edge of the heating zone 1 where the heating wire 2 is located can serve as a reserved space to allow an electrode connecting structure (described in detail later) for electrically connecting the heating wire group and the heating electrode to be laid out therein, thereby preventing the electrode connecting structure from interfering with the heating wire group corresponding to the another heating zone 1 passing through the heating zone where the electrode connecting structure is located. For example, as shown in FIG. 2, for each row of heating zones 1 arranged in the first direction (i.e., the Y direction), the heating zone 11*a* is adjacent to the first side edge 1*a*, a pitch between the two heating wires 2 (a distance therebetween in the X direction) in the heating wire group corresponding to the heating zone 11*a* is the greatest, a pitch between the two heating wires 2 in the heating wire group corresponding to the heating zone 11*c* is the least, and a pitch between the two heating wires 2 in the heating wire group corresponding to the heating zone 11*b* has a median of the former pitches. The above-described electrode connecting structure is not shown in FIG. 1.

In some alternative implementations, as shown in FIG. 2, the heating wires 2 in each heating wire group are all located in a first pixel interval 1*b*, where the first pixel interval 1*b* is an interval between any two adjacent rows or columns of sub-pixels (e.g., sub-pixels R, G, B) arranged in the first direction (i.e., the Y direction) in the display areas AA; furthermore, for the respective rows of heating zones 1 arranged in the second direction (i.e., the X direction), the first pixel interval 1*b* in which the heating wire group corresponding to one of two adjacent heating zones 1 is located is adjacent to the first pixel interval 1*b* in which the heating wire group corresponding the other one of the two adjacent heating zones 1 is located. Specifically, for every two adjacent heating zones 1 in the same row, the first heating wire in the heating wire group corresponding to one of the two adjacent heating zones 1, and the first heating wire in the heating wire group corresponding to the other of the two adjacent heating zones 1 are respectively positioned in two adjacent first pixel intervals 1*b*, and the second heating wire in the heating wire group corresponding to one of the two adjacent heating zones 1, and the second heating wire in the heating wire group corresponding to the other of the two adjacent heating zones 1 are respectively located in two adjacent first pixel intervals 1*b*. For example, if the first heating wire in the heating wire group corresponding to one of the two adjacent heating zones 1 is located in the first pixel interval 1*b* closest to the edge of the heating zone in the second direction, the first heating wire of the heating wire group corresponding to the other of the two adjacent heating zones 1 is located in the first pixel interval 1*b* secondly closest to the edge of the heating zone in the second direction. As shown in FIG. 2, two heating wires 2 of the heating wire group corresponding to the heating zone 11a are located in the first pixel intervals 1b closest to the edges of the heating zone in the second direction, respectively, and two heating wires 2 of the heating wire group corresponding to the heating zone 11b adjacent to the heating zone 11a are located in the first pixel intervals 1b secondly closest to the edges of the heating zone in the second direction, respectively. In other words, the first heating wires in the heating wire groups corresponding to every two adjacent heating zones 1 in the same row have a distance of one sub-pixel therebetween; and the second heating wires in the heating wire groups corresponding to every two adjacent heating zones 1 in the same row have a distance of one sub-pixel therebetween.

Therefore, on the premise of ensuring normal display, the number of the heating wire groups distributed in the same row of heating zones 1 can be increased to the greatest extent, and it is easy to understand that the more the number of the heating wire groups is, the more the number of the heating zones 1 in the same row is, and the more the number of the heating zones is, the higher the flexibility and accuracy of zone temperature control is, so that the temperature uniformity of the display area AA can be further improved. In some implementations, as shown in FIG. 2, each of the first pixel intervals 1b in the heating zone 11a closest to the first side edge 1a is provided with the heating wire 2 therein, where two heating wires 2 in the heating wire group corresponding to the heating zone 11a are respectively located in two first pixel intervals 1b adjacent to the edges of the heating zone 11a, and the remaining first pixel intervals are all configured to allow the heating wire groups corresponding to the heating zones other than the heating zone 11a to pass therethrough. In this way, on the premise that only one heating wire can be provided in each first pixel interval, the number of heating wire groups in the same row of heating zones 1 reaches the maximum value, that is, the number of corresponding heating zones 1 in the same row also reaches the maximum value. It can be seen that the maximum value of the number of the heating zones 1 in the same row depends on the resolution of the display panel.

Certainly, in practical applications, the number of the heating wire groups disposed in the same row of the heating zones 1 may be set as desired, and may be less than the above maximum value, for example, in this case, there is at least one pair of heating zones 1 adjacent to each other in the same row, where the first heating wire in the heating wire group corresponding to one of the pair of heating zones 1 and the first heating wire in the heating wire group corresponding to the other of the pair of heating zones 1 are respectively located in two first pixel intervals that are not adjacent to each other, and the second heating wire in the heating wire group corresponding to one of the pair of heating zones 1 and the second heating wire in the heating wire group corresponding to the other of the pair of heating zones 1 are respectively located in two first pixel intervals that are not adjacent to each other. The number of the heating zones 1 in the same row may be freely set as desired, and is not limited in the embodiment of the present disclosure.

In some alternative implementations, as shown in FIGS. 2, 3A to 3C, and 6, in each row of heating zones 1 arranged in the first direction (i.e., the Y direction), the heating wire group corresponding to the heating zone 11a adjacent to the first side edge 1a includes two heating wires 2 including a third heating wire and a fourth heating wire, which are respectively located in two first pixel intervals 1b adjacent to the edges of the heating zone 11a and are respectively electrically connected to two opposite edge positions of the heating electrode corresponding to the heating zone 11a through via holes 21. Specifically, the heating electrodes are arranged in different layers from the heating wires. Compared to other first pixel intervals, the first pixel intervals 1b, in which the two heating wires 2 in the heating wire group corresponding to the heating zone 11a adjacent to the first side edge 1a are located, are closest to the two opposite side edges of the heating zone 11a in the second direction (i.e., the X direction), respectively, in this case, the heating wire group corresponding to the heating zone 11a adjacent to the first side edge 1a may be directly electrically connected to the heating electrode through via holes 21, i.e., at the two opposite edge positions of the heating electrode (the positions respectively corresponding to the first pixel intervals 1b closest to the two opposite side edges of the heating zone 11a), so that the heating signal may pass through the entire heating electrode, that is, the heating signal flows from the edge position on one side of the heating electrode to the edge position on the other side of the heating electrode in the X direction, thereby preventing the corresponding local region of the display area AA from being unheated due to the fact that the current does not flow through the local region of the heating electrode, therefore, the heating uniformity can be improved. Specifically, a connecting portion 22 corresponding to the via hole 21 is provided at a side of the heating wire 2 for electrically connecting the via hole 21 with the heating wire 2.

In some alternative implementations, as shown in FIGS. 2, 4A to 6, in each row of the heating zones 1 arranged in the first direction, the heating wire groups corresponding to the heating zones (e.g., the heating zone 11b shown in FIGS. 4A and 4B, and the heating zone 11c shown in FIGS. 5A and 5B) which are not adjacent to the first side edge 1a, the heating zones 1 each include two heating wires 2 including a fifth heating wire and a sixth heating wire, respectively, and the fifth heating wire and the sixth heating wire respectively extend into two first pixel intervals (i.e., the second intervals 1b2 shown in FIGS. 4A and 5A) adjacent to the edges of the heating zone 11b through connecting wire structures, and are respectively electrically connected to the two opposite edge positions of the heating electrode corresponding to the heating zone 11b through the via holes 21. Specifically, for each of the heating wire groups corresponding to the heating zones (for example, the heating zone 11b shown in FIGS. 4A and 4B, and the heating zone 11c shown in FIGS. 5A and 5B) which are not adjacent to the first side edge 1a, the first pixel intervals (for example, the first interval 1b1 shown in FIGS. 4A and 5A) in which the heating wires 2 are located are not adjacent to the two opposite side edges of the heating zone in the second direction, in such case, the heating wire group cannot be electrically connected to the heating electrode directly through the via holes 21, otherwise, the connection positions cannot be respectively located at the two opposite edge positions of the heating electrode, therefore, it is necessary to firstly respectively lead the heating wire 2 into the first pixel interval (that is, the second interval 1b2 shown in FIGS. 4A and 5A) adjacent to the edge of the heating zone (for example, the heating zones 11b, 11c respectively shown in FIGS. 4A and 5A) by means of the above-described connecting wire structure, and then respectively electrically connect the connecting wire structures with the two opposite edge positions of the heating electrode corresponding to the heating zone through the via holes 21. The leading the heating wire 2 into the first pixel interval adjacent to the edge of the heating zone means that the current in the heating wire 2 can flow into the first pixel interval adjacent to the edge of the heating zone 1 by means of the above-mentioned connecting wire structure. The connecting wire structure is electrically connected to the edge position of the corresponding heating electrode through the via holes 21, and the heating wire 2 is electrically connected to the connecting wire structure, thereby the heating wire 2 may be indirectly electrically connected to the edge position of the heating electrode. In this way, the heating signal can pass through the entire heating electrode likewise.

The connecting wire structure for implementing the above functions is not particularly limited in the embodiments of the present disclosure, and in some alternative implementations, as shown in FIGS. 4A to 5B, the connecting wire structure includes a main connecting line 51 and an auxiliary connecting line 52, where the main connecting line 51 is parallel to the first direction; the auxiliary connecting line 52 intersects with the heating wire (i.e., one of the fifth heating wire or the sixth heating wire described above). In some implementations, the auxiliary connecting line 52 is perpendicular to the heating wire; the first pixel intervals (which are not adjacent to the edges of the heating zone) where the two heating wires 2, that is, the fifth heating wire and the sixth heating wire, are located are first intervals 1b1, the first pixel interval adjacent to the edges of the heating zone are second intervals 1b2, and as shown in FIG. 5A, a first pixel interval between the first interval 1b1 and the second interval 1b2 is a third interval 1b3. Each of the third intervals 1b3 and the second intervals 1b2 is provided with one main connecting line 51 therein, that is, each and every first pixel interval on the side of the heating wire 2 close to the edge of the heating zone is provided with the main connecting line 51, and the main connecting line 51 is only arranged in the heating zone where the main connecting line 51 is located and does not extend to other heating zones. The auxiliary link line 52 is located in a second pixel interval 1c, the second pixel interval 1c is an interval between any two adjacent columns of sub-pixels arranged in the second direction (i.e., the X direction), at least one auxiliary connecting line 52 is connected between two main connecting lines 51 adjacent to each other, and at least one auxiliary link line 52 is connected between each of the heating wires 2, i.e., each of the fifth heating wire and the sixth heating wire, in the heating wire group and the main connecting line 51 adjacent thereto. By means of the auxiliary connecting lines 52, it is possible to electrically conduct the respective main connecting lines 51 to each other, and conduct the heating wire group to the main connecting lines 51, so that each of the heating wires 2, i.e., each of the fifth heating wire and the sixth heating wire, in the heating wire group can be led into the above-described second intervals 1b2, and the main connecting lines 51 in the second intervals 1b2 are respectively electrically connected with the two opposite edge positions of the heating electrode corresponding to the heating zone through the via holes 21.

Since the main connecting line 51 can also play a role of auxiliary heating, the main connecting line 51 is arranged in each and every first pixel interval on the side of the heating wire group close to the edge of the heating zone, the heating effect of the heating zone in which the main connecting line 51 is arranged is substantially equivalent to that of the heating zone closest to the first side edge 1a (i.e., the heating zone 11a in FIG. 2, where the heating wire group is arranged in each and every first pixel interval), the influence of the auxiliary connecting line 52 may be ignored, and the uniformity of the heating effects among the heating zones can be further improved under the condition that all the heating electrodes are loaded with the heating signals with the same intensity, so that when the temperature difference of different heating zones is desired to be compensated, the accuracy of temperature compensation can be ensured.

Figure 3A:
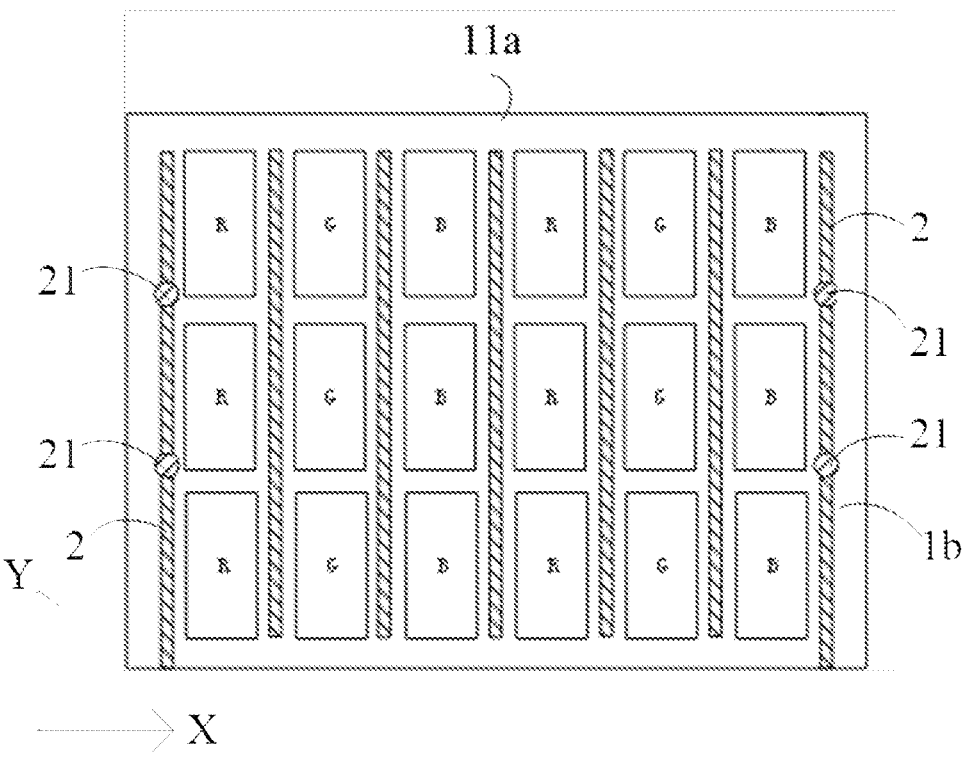
FIG. 3A is a schematic structural diagram illustrating a heating zone adjacent to a first side according to an embodiment of the present disclosure.
Figure 3B:
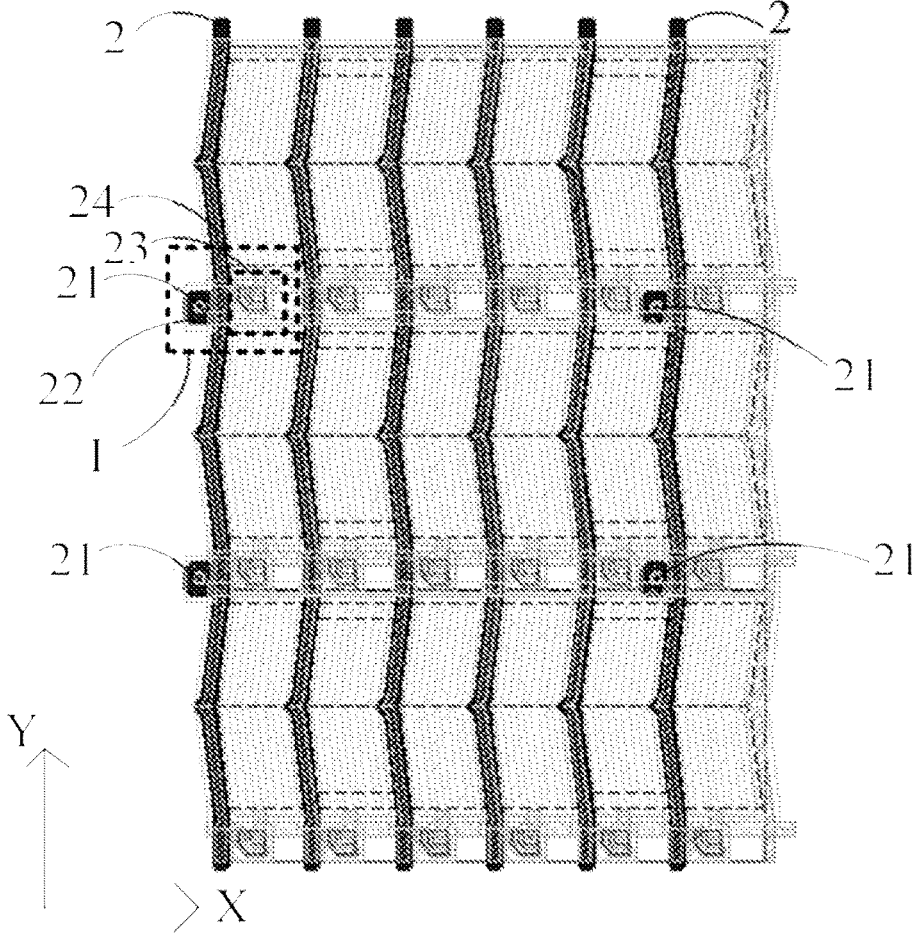
FIG. 3B is a top perspective view of a heating zone adjacent to a first side according to an embodiment of the present disclosure.
Figure 4A:
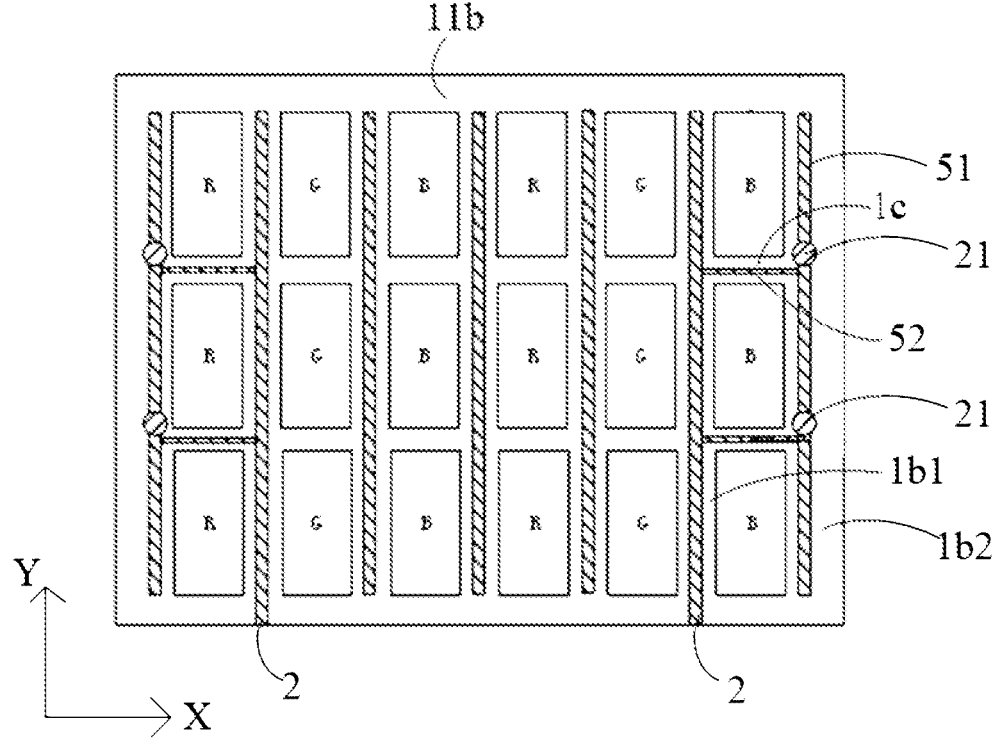
FIG. 4A is a schematic structural diagram illustrating a heating zone that is not adjacent to a first side according to an embodiment of the present disclosure.
Figure 4B:
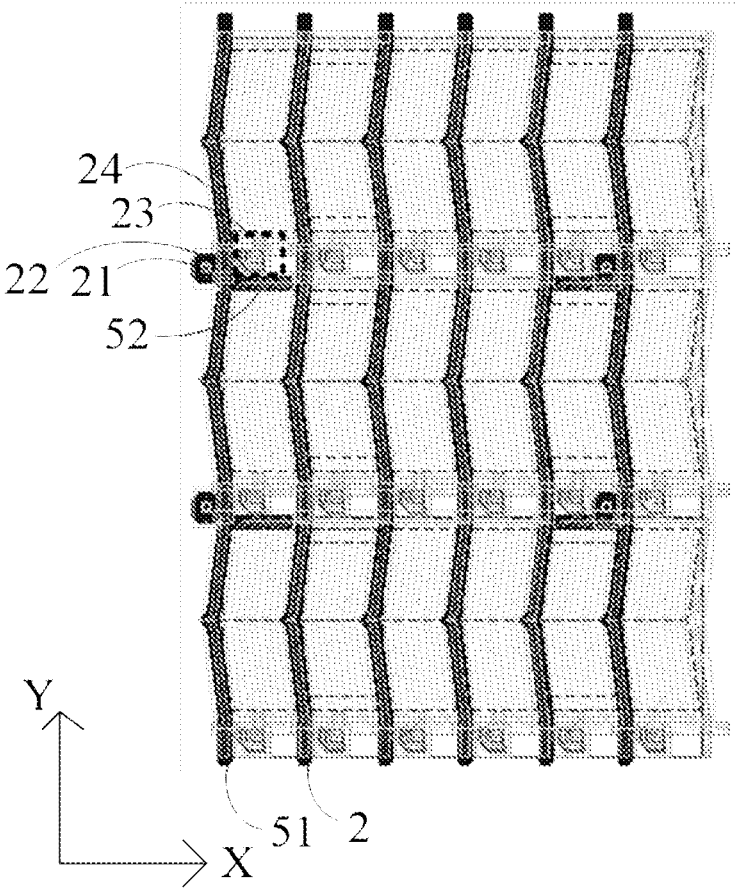
FIG. 4B is a top perspective view of a heating zone that is not adjacent to a first side according to an embodiment of the present disclosure.
Figure 5A:
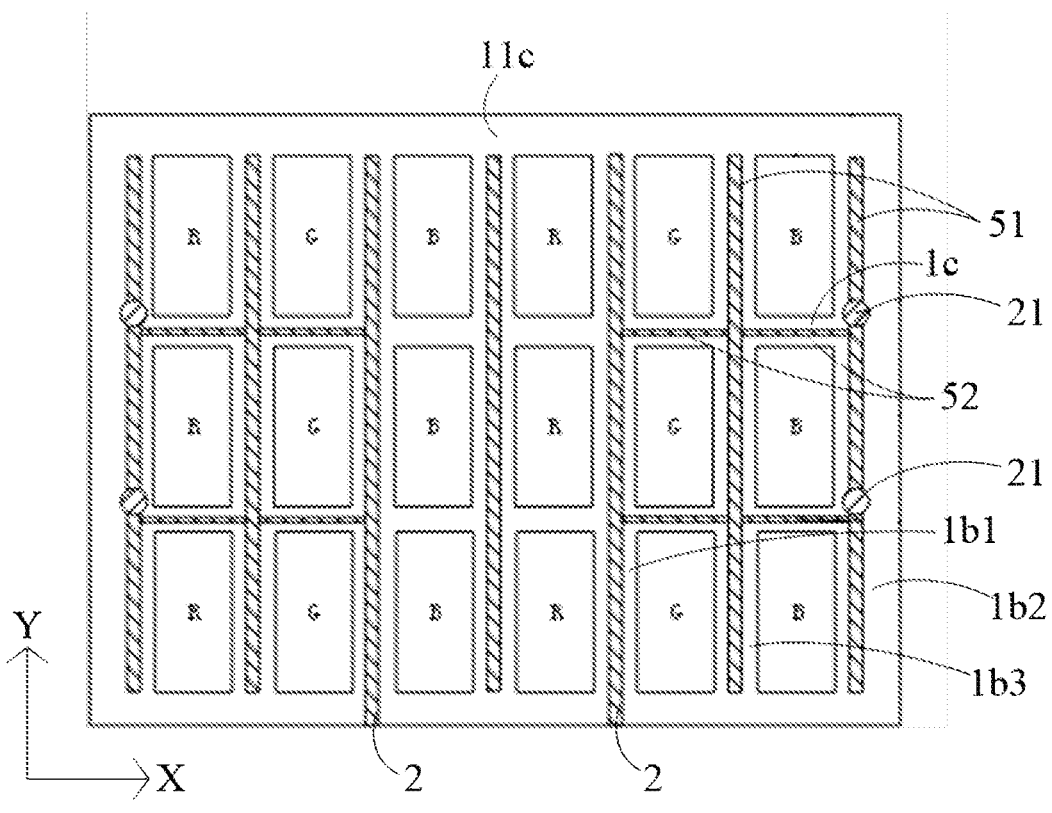
FIG. 5A is a schematic structural diagram illustrating a heating zone that is not adjacent to a first side according to an embodiment of the present disclosure.
Figure 5B:
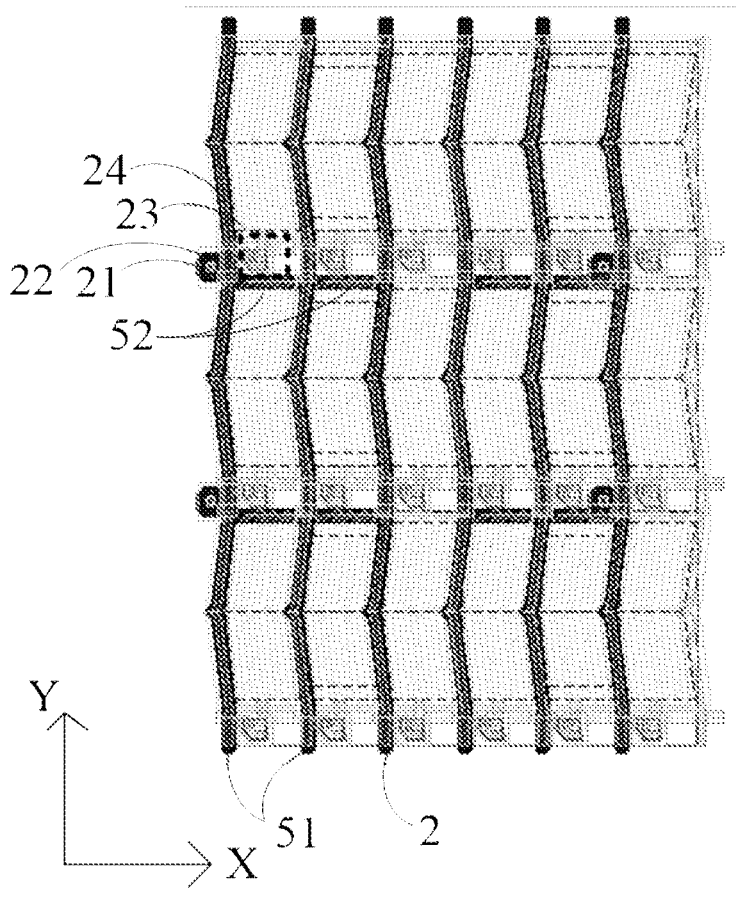
FIG. 5B is a schematic structural diagram illustrating a heating zone that is not adjacent to a first side according to an embodiment of the present disclosure.

In some alternative implementations, the via hole 21 is disposed in at least one second pixel interval (i.e., the second pixel interval 1c in FIG. 5A) in each heating zone, and the second pixel interval 1c is an interval between any two adjacent columns of sub-pixels arranged in the second direction. In this way, the light transmissivity and the light efficiency of display area AA can be prevented from being affected by the provision of the via hole 21. Alternatively, one via hole 21 may be provided at a side of each sub-pixel R and one via hole 21 may be provided at a side of each sub-pixel B, for example, as shown in FIGS. 3A, 4A and 5A, one via hole 21 may be provided at the left side of each sub-pixel R and one via hole 21 may be provided at the right side of each sub-pixel B; alternatively, as shown in FIG. 3B, FIG. 4B and FIG. 5B, one via hole 21 may be disposed on the left side of each sub-pixel R, and one via hole 21 may be disposed on the left side of each sub-pixel B, which is not particularly limited in the embodiment of the present disclosure, as long as the light transmittance and the light efficiency of the display area AA are not affected by the disposition of the via hole 21.

Figure 3C:
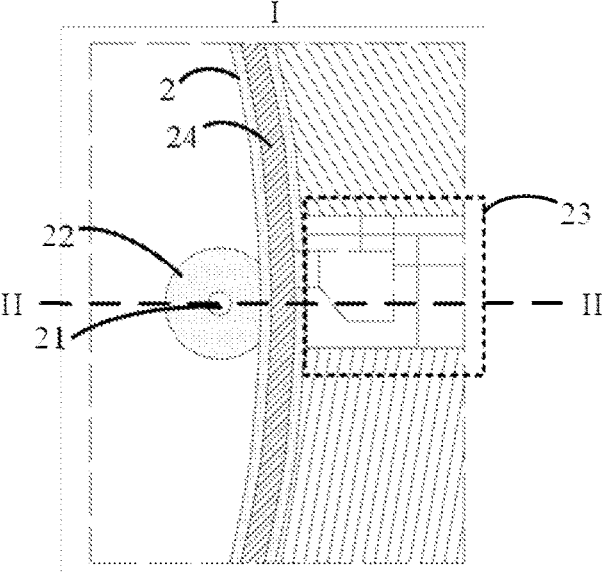
FIG. 3C is an enlarged view of a portion of a region I in FIG. 3B.
Figure 6:
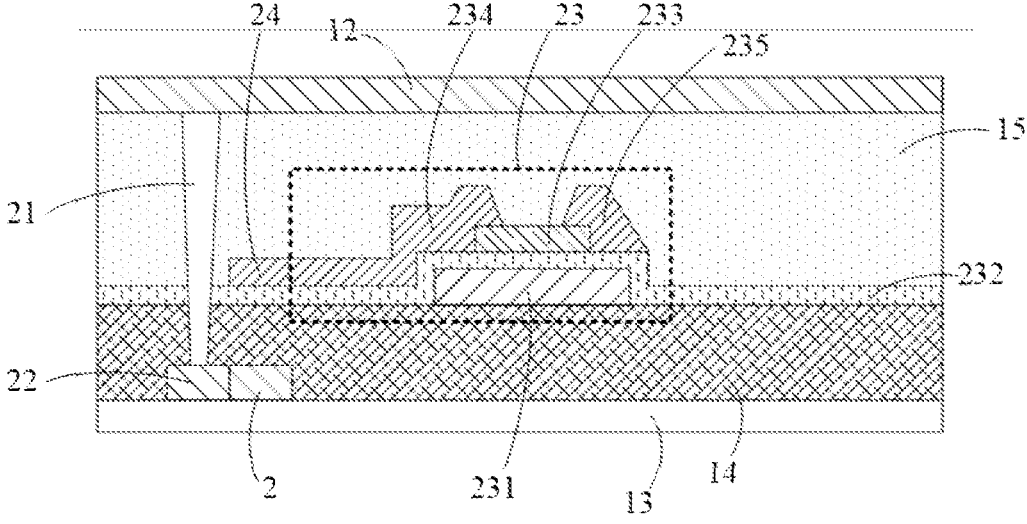
FIG. 6 is a schematic cross-sectional view of the structure in FIG. 3C taken along line II-II.

In some alternative implementations, as shown in FIG. 3C and FIG. 6, the array substrate includes a base substrate 13, and a thin film transistor 23 and a passivation layer 15 that are disposed on the base substrate 13 sequentially disposed along a direction away from the base substrate 13, where each sub-pixel is correspondingly disposed with one thin film transistor 23; each heating electrode 12 is arranged on a side of the passivation layer 15 away from the base substrate 13; the array substrate further includes an insulating layer 14, each heating wire group (the heating wires 2) is disposed on the base substrate 13, and the insulating layer 14 is disposed between a layer where each heating wire group is located and a gate layer 231; the array substrate further includes a data line 24, and the via hole 21 is located on a side of the data line 24 away from the thin film transistor 23, is provided between the heating electrode 12 and the heating wire group (the heating wires 2 in the heating wire group) corresponding thereto, and sequentially penetrates through the passivation layer 15, a gate insulating layer 232 of the thin film transistor 23 and the insulating layer 14 along a direction close to the base substrate 13.

In some alternative implementations, as shown in FIGS. 3C and 6, an orthographic projection of the heating wire 2 in each heating wire group on the base substrate 13 is overlapped with an orthographic projection of the data line 24 adjacent to the first pixel interval where the heating wire 2 is located on the base substrate 13; a width of each heating wire 2 in each heating wire group is equal to or less than a width of the data line 24. In this way, the heating wire 2 can be prevented from affecting the light transmittance of the display area AA, and the width of each heating wire 2 in each heating wire group is set to be equal to or less than the width of the data line 24, thereby reducing adverse effects of an electric field generated by the heating wire 2 and the data line 24 opposite to the heating wire, and ensuring the display effect.

In some alternatively implementations, the heating electrode may be an electrode additionally disposed on the basis of the existing structure of the array substrate, and in some implementations, the heating electrode is a transparent metal oxide electrode block (i.e., an electrode block made of a transparent metal oxide), and for example, the transparent metal oxide includes ITO. The heating wire in the heating wire group is made of a conductive metal, for example, the conductive metal includes any one or more of aluminum, copper, and molybdenum. Since a sheet resistance of the conductive metal (e.g., about $0.15\Omega/\mu m^2$ for aluminum and about $0.38\Omega/\mu m^2$ for molybdenum) is generally much less than a sheet resistance of the transparent metal oxide (about $27\Omega/\mu m^2$ for ITO), a sheet resistance of the transparent metal oxide electrode block is much greater than the sheet resistance of the conductive metal (the heating wire). As can be seen from the power formula $P=I^2R$, the larger the resistance R is, the larger the thermal power is, and therefore, the generated heat is mainly concentrated on the transparent metal oxide electrode block, i.e., the transparent metal oxide electrode block plays a main heating role, and the conductive metal (the heating wire) plays an auxiliary heating role. Therefore, under the condition that the heating signals with the same intensity are loaded onto all the transparent metal oxide electrode blocks, the uniformity of the heating effect of all the transparent metal oxide electrode blocks can be ensured, and the accuracy of temperature compensation can be ensured in a case where the temperature difference of different heating zones is desired to be compensated. Certainly, in practical applications, the material of the heating wire may alternatively be a transparent metal oxide such as ITO as desired. The material of the main connecting line 51 and the auxiliary connecting line 52 may be a conductive metal or a transparent metal oxide such as ITO.

In some alternatively implementations, the electrodes in the existing array substrate may be multiplexed as the heating electrodes. For example, the array substrate further includes a common electrode, the common electrode includes a plurality of transparent metal oxide electrode blocks, and the transparent metal oxide electrode blocks may be multiplexed as the heating electrodes. The common electrode has two functions of displaying and heating. Because the common electrode adopts the transparent metal oxide electrode blocks, the generated heat may be mainly concentrated on the electrode block made of the transparent metal oxide, and therefore, the uniformity of the heating effect of all the transparent metal oxide electrode blocks can be ensured under the condition that the heating signals with the same intensity are loaded onto all the transparent metal oxide electrode blocks. Alternatively, as shown in FIG. 6, the heating electrode 12 serves as a common electrode, and the heating electrode 12 and the heating wires are arranged in different layers, in which case the heating electrode 12 is electrically connected to each heating wire 2 through a via hole 21. However, the embodiment of the present disclosure is not limited to this, and in practical applications, each heating wire group may be disposed in the same layer as the common electrode (which is multiplexed as the heating electrode), and no via hole is desired.

Figures 7, 8:
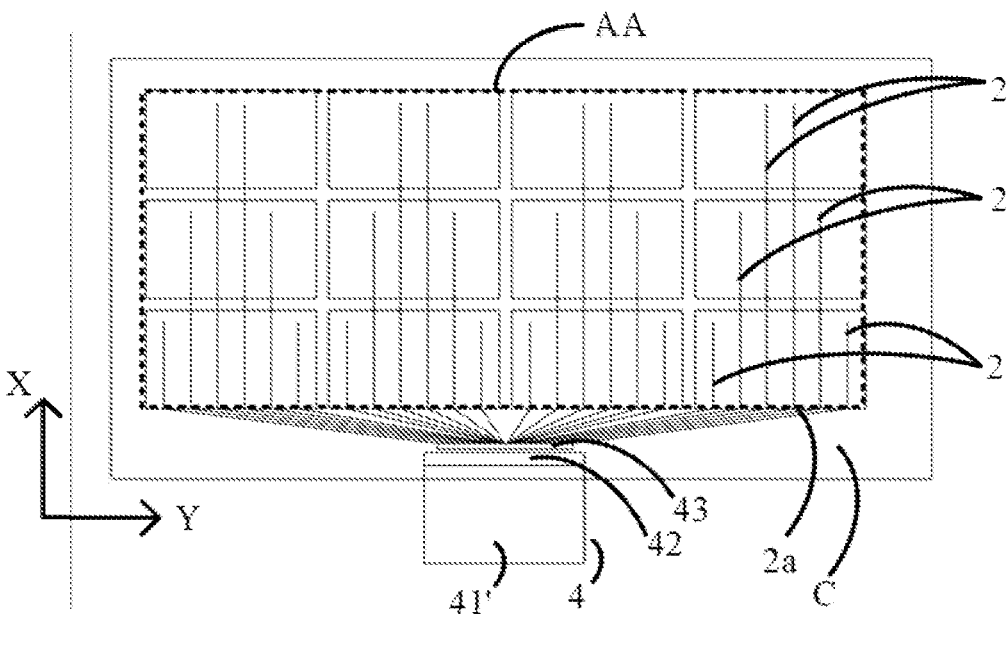
FIG. 7 is a schematic structural diagram of an array substrate according to an embodiment of the present disclosure.
FIG. 8 is a timing diagram of a Source signal and a Com signal according to an embodiment of the present disclosure.

In order to ensure that both of the above-mentioned two functions (i.e., displaying and heating) of the common electrode can be performed normally, the heating signal and a driving signal for displaying may be input to the common electrode in the following three different ways. In a first way, as shown in FIG. 1, the array substrate further includes a display driving module 4, the display driving module 4 includes, for example, a flexible circuit board (FPC) 41 and an integrated circuit 43 for controlling display, and the flexible circuit board 41 is electrically connected to the integrated circuit 43 through, for example, FPC pins 42 for transmitting signals. In some implementations, the display driving module 4 and the zone temperature control module 3 are both located in the peripheral area C, the zone temperature control module 3 is adjacent to a first side edge 1a of the display area AA, the display driving module 4 is adjacent to a second side edge 2a of the display area AA, and the first side edge 1a intersects with the second side edge 2a; the first terminal of each heating wire group extends out from the first side edge 1a and is electrically connected with the zone temperature control module 3. As shown in FIG. 8, the display driving module 4 is configured to periodically input a driving signal (Source) to the transparent metal oxide electrode blocks, where each cycle of the driving signal includes a signal-on period (i.e., a period of the Source signal corresponding to a display time in FIG. 8) and a signal-off period; the zone temperature control module 3 inputs a heating signal (Com) to each electrode block made of the transparent metal oxide during the signal-off period, and stops inputting the heating signal to each electrode block made of the transparent metal oxide during the signal-on period. Each cycle of the above-described driving signal is, for example, a duration of one frame of display screen, and the duration is divided into two periods, one of which is for displaying and at least a part of the other of which is for heating. In this case, the zone temperature control module 3 may be configured to control the temperature of the corresponding heating zone 1 by controlling a length of time occupied by the heating signal in the signal-off period of each cycle (i.e., the length of time of the heating signal (Com) corresponding to the heating time in FIG. 8).

Figures 9, 10:
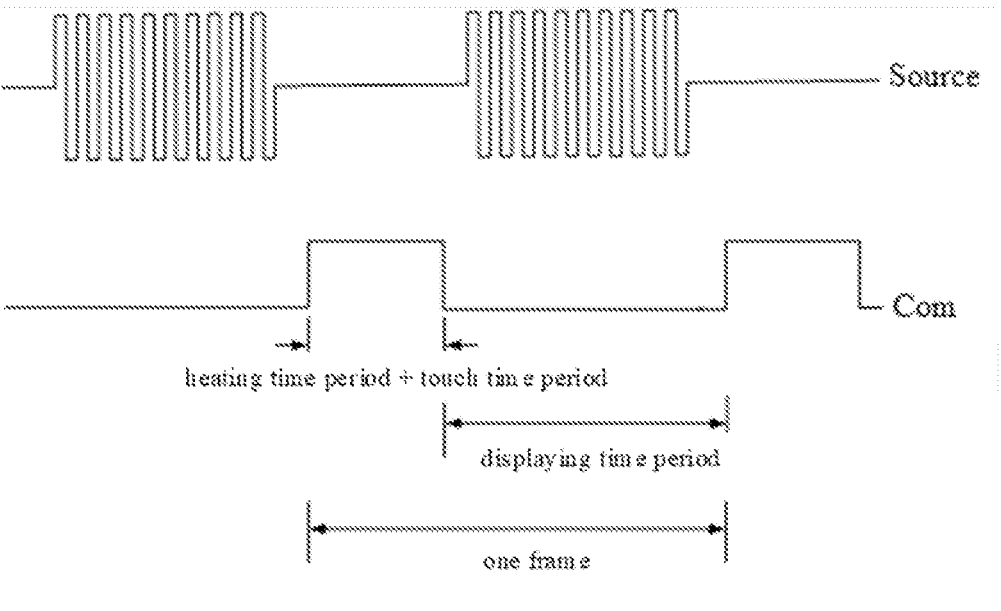
FIG. 9 is a timing diagram of a Source signal and a Com signal according to an embodiment of the present disclosure.
FIG. 10 is a timing diagram of a Source signal and a Com signal according to an embodiment of the present disclosure.

In a second way, the common electrode may further be multiplexed as a touch electrode, and the common electrode has three functions of displaying, touch and heating. In this case, as shown in FIG. 7, it is not necessary to separately provide the zone temperature control module, and in some implementations, the display driving module and the touch driving module are integrated together and located in the peripheral area C, and the integrated display driving module and touch driving module are close to the second side edge 2a of the display region AA; the first terminal of each heating wire group extends out from the second side edge 2a, and is electrically connected with the integrated display driving module and touch driving module. Specifically, the display driving module and the touch driving module integrated together include a flexible printed circuit (FPC) 41' and an integrated circuit 43, and a side edge of the display area AA where the display driving module and the touch driving module integrated together are located is the second side edge 2a, for example, the second side edge 2a is parallel to the Y direction. The first terminals of each heating wire group are electrically connected with the touch driving module and the display driving module, respectively, that is, the first terminal of one of two heating wires in each heating wire group is electrically connected with the touch driving module, and the first terminal of the other of the heating wires in each heating wire group is electrically connected with the display driving module. In this case, the flexible circuit board (FPC) 41' and the integrated circuit 43 have a TDDI (Touch and Display Driver Integration) function, that is, integrate the touch driving module and the display driving module, since a frequency and an intensity of a touch signal output by the touch driving module are adjustable, and the first terminal of one of the heating wires in the heating wire group is electrically connected to the touch driving module and the first terminal of the other of the heating wires in the heating wire group is electrically connected to the display driving module, the heating signal can be looped, so that the touch driving module can be used as the zone temperature control module. Specifically, as shown in FIG. 9, the display driving module is configured to periodically input a driving signal (Source) to the plurality of transparent metal oxide electrode blocks, where each cycle of the driving signal includes a signal-on period (i.e., a period of the driving signal (Source) corresponding to a displaying time in FIG. 9) and a signal-off period; the touch driving module is multiplexed as the zone temperature control module, and inputs a touch signal (Com) to each transparent metal oxide electrode block in the signal-off period, independently controls, by using the touch signal as a heating signal, the intensity and/or the time duration of the touch signal input to the transparent metal oxide electrode blocks in the corresponding heating zone, and stops inputting the touch signal to each transparent metal oxide electrode block in the signal-on period. Each cycle of the driving signal is, for example, a duration of one frame of display screen, the duration is divided into two time periods, one of which is used for displaying, and at least a part of the other of which is used for touch control and heating at the same time. In this case, the touch driving module serving as the zone temperature control module may be used to control the temperature of the corresponding heating zone by controlling a time length occupied by the touch signal (which is also the heating signal) in the signal-off period of each cycle (i.e., the length of time of the touch signal (Com) corresponding to the heating time plus the touch time in FIG. 9).

In the case where the requirement for uniformity of the surface temperature of the liquid crystal display panel is high, in order to meet the requirement for touch recognition, the intensity of the touch signal and the duration of the touch signal in each cycle (duration of a frame of display screen) of the driving signal are equal, in this case, since the temperature of the heating zone cannot be adjusted by changing the duration of heating, the touch signal cannot be multiplexed as the heating signal, and in this case, a third way may be adopted, that is, the common electrode may be multiplexed as the touch electrode, that is, the common electrode has three functions of displaying, touch and heating. The array substrate further includes a touch driving module and a display driving module, and like the above second way, the display driving module and the touch driving module integrated together include a flexible printed circuit (FPC) 41' and an integrated circuit 43, which have a TDDI (Touch and Display Driver Integration) function, and the first terminals of each heating wire group are electrically connected to the touch driving module and the display driving module, respectively, that is, a first terminal of one of the heating wires in each heating wire group is electrically connected to the touch driving module, and a first terminal of the other of the heating wires in each heating wire group is electrically connected to the display driving module, so that a heating signal can be looped, and the touch driving module can be used as the zone temperature control module. Specifically, as shown in FIG. 10, the display driving module is configured to periodically input a driving signal (Source) to the plurality of transparent metal oxide electrode blocks, where each cycle of the driving signal includes a signal-on period (i.e., a period of the driving signal (Source) corresponding to a displaying time in FIG. 10) and a signal-off period; the touch driving module is used as a zone temperature control module, and individually inputs a touch signal (Com) to each transparent metal oxide electrode block during a first sub-period (i.e., a period of the driving signal (Com) corresponding to a touch time in FIG. 10) in the signal-off period, individually inputs a heating signal (Com) to each transparent metal oxide electrode block during a second sub-period (i.e., a period of the heating signal (Com) corresponding to a heating time in FIG. 10) in the signal-off period, and stops inputting the touch signal and the heat signal to each transparent metal oxide electrode block during the signal-on period. That is to say, although the touch driving module is still used as the zone temperature control module, the touch signal and the heating signal output by the touch driving module are not output at the same time period, that is, they cannot be output simultaneously, and thus, the duration of the touch signal output in the first sub-period in each cycle of the driving signal (duration of a frame of display screen) can be ensured to be consistent, and the duration of the heating signal output in the second sub-period in the signal off-period of each cycle (i.e., the time of the second sub-period) can be controlled to control the temperature of the corresponding heating zone.

In summary, in the array substrate provided in the embodiment of the present disclosure, the heating electrodes play a main heating role, and each heating wire group plays an auxiliary heating role, compared with the heating wires in the related art, on one hand, the plurality of heating electrodes can substantially cover the whole display area AA, thereby being beneficial to improving the heating uniformity; on the other hand, the layout of the heating electrodes can be matched with the division mode of the heating zones 1, namely, the zone control can be carried out more flexibly without being limited by the wiring of the heating wires, so that the problem that in the related art, the heat compensation cannot be carried out in the extending direction in which the heating wires extend due to that zone control cannot be performed on different regions of the display area AA in the extending direction, can be avoided, and the temperature uniformity of the whole display area AA can be controlled. Further, for a low temperature environment, in the embodiment of the present disclosure, it is only needed to increase the intensity 1 and/or the time duration of the heating signal input to the heating electrode in the heating zone 1 located in the peripheral region of the display area AA, so as to separately increase the temperature of the peripheral region of the display area AA, that is, selectively heat without increasing the power of all the heating wires as in the related art, thereby not only avoiding the temperature of the peripheral region of the display area AA from being too low, but also avoiding the temperature of the central region of the display area AA from being too high, and further avoiding the increase of the overall power consumption.

Meanwhile, each heating wire group further plays a role in transmitting the heating signals, and the two heating wires 2 in each heating wire group are electrically connected with the two opposite edge positions of the heating electrode in the corresponding heating zone 1, so that the heating signals can pass through the whole heating electrode, the situation that a local region of the display area AA is not heated due to the fact that the current does not pass through the local region of the heating electrode can be avoided, and the heating uniformity can be improved. In addition, each heating wire group is configured to transmit the heating signal, so that the uniformity of heating effect of all the heating electrodes can be ensured under the condition that the heating signals with the same intensity are loaded to all the heating electrodes, therefore, when the temperature difference of different heating zones 1 needs to be compensated, the accuracy of temperature compensation can be ensured.

As another technical solution, an embodiment of the present disclosure further provides a liquid crystal display panel, including the array substrate provided in the embodiment of the present disclosure.

According to the liquid crystal display panel provided by the embodiment of the present disclosure, by adopting the array substrate provided in the embodiment of the present disclosure, the problem that in the prior art, the heat compensation cannot be carried out in the extending direction in which the heating wires extend due to that zone control cannot be performed on different regions of the display area AA in the extending direction, can be avoided, and the temperature uniformity of the whole display area AA can be controlled It is to be understood that the above embodiments are merely exemplary embodiments that are employed to illustrate the principles of the present disclosure, which is not to be construed as limiting the present disclosure. It will be apparent to those skilled in the art that various modifications and improvements can be made without departing from the spirit and essence of the present disclosure, and such modifications and improvements are also considered to be within the scope of the present disclosure.

What is claimed is:

1. An array substrate, comprising a display area and a peripheral area surrounding the display area, wherein the display area is divided into a plurality of heating zones, the plurality of heating zones are arranged into an array and each heating zone is provided with a heating electrode;

the array substrate further comprises a zone temperature control module and a heating wire module, the heating wire module comprises a plurality of heating wire groups, the heating wire groups are arranged corresponding to the heating zones one to one, and a first terminal of each heating wire group is electrically connected with the zone temperature control module; and the zone temperature control module is located in the peripheral area, and is configured to control each heating wire group to input a heating signal into the heating zone corresponding thereto, wherein the heating electrodes and the heating wire groups are in different layers; and the zone temperature control module is on a side of the plurality of heating zones, each heating wire group extends, in a direction away from the zone temperature control module, into one of the heating zones corresponding thereto.

2. The array substrate of claim 1, wherein a plurality of the heating wire groups are spaced apart from each other and in parallel in a first direction, and average lengths of the heating wire groups are different from each another.

3. The array substrate of claim 2, wherein each of the heating wire groups comprises a first heating wire and a second heating wire, one of the first heating wire or the second heating wire being electrically connected to a signal input terminal of the zone temperature control module, and the other of the first heating wire or the second heating wire being electrically connected to a signal output terminal of the zone temperature control module, and the first heating wire and the second heating wire are electrically connected to two opposite edge positions of the heating electrode in a corresponding heating zone.

4. The array substrate of claim 2, wherein the display area comprises M×N heating zones arranged in an array, each of the heating zones comprises m×n sub-pixels arranged in an array, wherein M, N, m and n are positive integers;

the first terminal of each heating wire group extends out from a first side edge of the display area and is electrically connected with the zone temperature control module; the first side edge is a side edge of the display area closest to the zone temperature control module; and a second terminal of each heating wire group extends from the first side edge to a corresponding heating zone in the first direction, and the heating wire groups corresponding to the heating zones arranged in each row in the first direction are staggered with each other in a second direction, the second direction being perpendicular to the first direction.

5. The array substrate of claim 4, wherein a heating wire in each heating wire group is located in a first pixel interval between any two adjacent rows of sub-pixels arranged in the second direction; and for each row of the heating zones arranged in the second direction, the first pixel interval where the heating wire group corresponding to one of any two adjacent heating zones is located is adjacent to the first pixel interval where the heating wire group corresponding to the other of the any two adjacent heating zones is located.

6. The array substrate of claim 5, wherein one of the heating wire groups corresponding to the heating zone adjacent to the first side edge in each row of the heating zones arranged in the first direction comprises a third heating wire and a fourth heating wire, and the third heating wire and the fourth heating wire are respectively located in two first pixel intervals adjacent to edges of the heating zone and respectively electrically connected to two opposite edge positions of the heating electrode corresponding to the heating zone through via holes, and each of the heating wire groups corresponding to the heating zones not adjacent to the first side edge in each row of the heating zones arranged in the first direction comprises a fifth heating wire and a sixth heating wire, and the fifth heating wire and the sixth heating wire extend into two first pixel intervals adjacent to edges of the heating zone through a connecting wire structure, respectively, and are electrically connected to two opposite edge positions of the heating electrode corresponding to the heating zone through via holes, respectively.

7. The array substrate of claim 6, wherein the connecting wire structure comprises a main connecting line and an auxiliary connecting line, the main connecting line being parallel to the first direction; the auxiliary connecting line intersecting one of the fifth heating wire or the sixth heating wire;

the first pixel intervals where the fifth heating wire and the sixth heating wire are located are both first intervals, the first pixel intervals adjacent to the edges of the heating zone are both second intervals, and the first pixel interval between the first interval and the second interval is a third interval; each third interval and each second interval are respectively provided with one main connecting line; and the auxiliary connecting line is located in a second pixel interval, the second pixel interval is an interval between any two adjacent columns of sub-pixels arranged in the second direction, at least one auxiliary connecting line is connected between every two adjacent main connecting lines, and at least one auxiliary connecting line is connected between each of the fifth heating wire and the sixth heating wire and the main connecting line adjacent thereto.

8. The array substrate of claim 6, wherein at least one second pixel interval in each heating zone is provided with the via hole, and the second pixel interval is an interval between any two adjacent columns of sub-pixels arranged in the second direction.

9. The array substrate of claim 6, wherein the array substrate comprises a base substrate, and a thin film transistor and a passivation layer which are arranged on the base substrate and sequentially arranged along a direction away from the base substrate, and each of the sub-pixels is provided with one thin film transistor correspondingly;

each heating electrode is arranged on a side, away from the base substrate, of the passivation layer;

the array substrate further comprises an insulating layer, the heating wire groups are arranged on the base substrate, and the insulating layer is arranged between a layer where the heating wire groups are located and a gate layer of the thin film transistor; and the array substrate further comprises a data line, the via hole is located on a side, away from the thin film transistor, of the data line, is arranged between the heating electrode and the corresponding heating wire group, and sequentially penetrates through the passivation layer, a gate insulating layer of the thin film transistor and the insulating layer along a direction close to the base substrate.

10. The array substrate of claim 9, wherein an orthographic projection of the heating wire in each heating wire group on the base substrate overlaps with an orthographic projection of the data line adjacent to the first pixel interval where the heating wire is located on the base substrate, and a width of the heating wire in each heating wire group is less than or equal to a width of the data wire.

11. The array substrate of claim 1, wherein a contour of an orthographic projection of the heating electrode on a plane where the display area is located coincides with a contour of the heating zone.

12. The array substrate of claim 1, further comprising a common electrode, wherein the common electrode comprises a plurality of transparent metal oxide electrode blocks, and the transparent metal oxide electrode blocks are multiplexed as the heating electrodes, wherein the heating wire groups are arranged in a same layer as the common electrode.

13. The array substrate of claim 12, further comprising a display driving module configured to periodically input a driving signal to the plurality of transparent metal oxide electrode blocks, wherein each cycle of the driving signal comprises a signal-on period and a signal-off period; and the zone temperature control module inputs the heating signal to the transparent metal oxide electrode blocks in the signal-off period and stops inputting the heating signal to the transparent metal oxide electrode blocks in the signal-on period.

14. The array substrate of claim 12, wherein the common electrode is further multiplexed as a touch electrode;

the array substrate further comprises a touch driving module and a display driving module, and the first terminals of each heating wire group are electrically connected with the touch driving module and the display driving module, respectively; and the display driving module is configured to periodically input a driving signal to the plurality of transparent metal oxide electrode blocks, and each cycle of the driving signal comprises a signal-on period and a signal-off period; the touch driving module is multiplexed as the zone temperature control module, and inputs a touch signal to each transparent metal oxide electrode block in the signal-off period, and simultaneously multiplexes the touch signal as the heating signal, independently controls an intensity and/or a time duration of the touch signal input to the transparent metal oxide electrode blocks in the corresponding heating zone, and stops inputting the touch signal to each transparent metal oxide electrode block in the signal-on period.

15. The array substrate of claim 12, wherein the common electrode is multiplexed as a touch electrode;

the array substrate further comprises a touch driving module and a display driving module, and the first terminals of each heating wire group are electrically connected with the touch driving module and the display driving module, respectively;

the display driving module is configured to periodically input a driving signal to the plurality of transparent metal oxide electrode blocks, and each cycle of the driving signal comprises a signal-on period and a signal-off period; the touch driving module is multiplexed as the zone temperature control module, independently inputs touch signals to the transparent metal oxide electrode blocks in a first sub-period of the signal-off period, independently inputs heating signals to the transparent metal oxide electrode blocks in a second sub-period of the signal-off period, and stops inputting the touch signals and the heating signals to the transparent metal oxide electrode blocks in the signal-on period.

16. The array substrate of claim 13, wherein the display driving module and the zone temperature control module are both located in the peripheral area, and the zone temperature control module is adjacent to the first side edge of the display area, and the display driving module is adjacent to a second side edge of the display area, the first side edge intersecting the second side edge; and the first terminal of each heating wire group extends out from the first side edge and is electrically connected with the zone temperature control module.

17. The array substrate of claim 14, wherein the display driving module and the touch driving module are integrated together and located at the peripheral area, and the display driving module and the touch driving module integrated together are adjacent to a second side edge of the display region; and the first terminal of each heating wire group extends out from the second side edge and is electrically connected with the display driving module and the touch driving module integrated together.

18. The array substrate of claim 12, wherein a material of the heating wire in the heating wire group is a conductive metal, and the conductive metal comprises any one or more of aluminum, copper, and molybdenum.

19. A liquid crystal display panel, comprising the array substrate of claim 1.

20. The array substrate of claim 15, wherein the display driving module and the touch driving module are integrated together and located at the peripheral area, and the display driving module and the touch driving module integrated together are adjacent to a second side edge of the display region; and the first terminal of each heating wire group extends out from the second side edge and is electrically connected with the display driving module and the touch driving module integrated together.

* * * * *